April 22, 1924.
E. T. ZOOK
AUTOMOBILE REPAIR HU.
Filed May 12, 1923
1,491,126
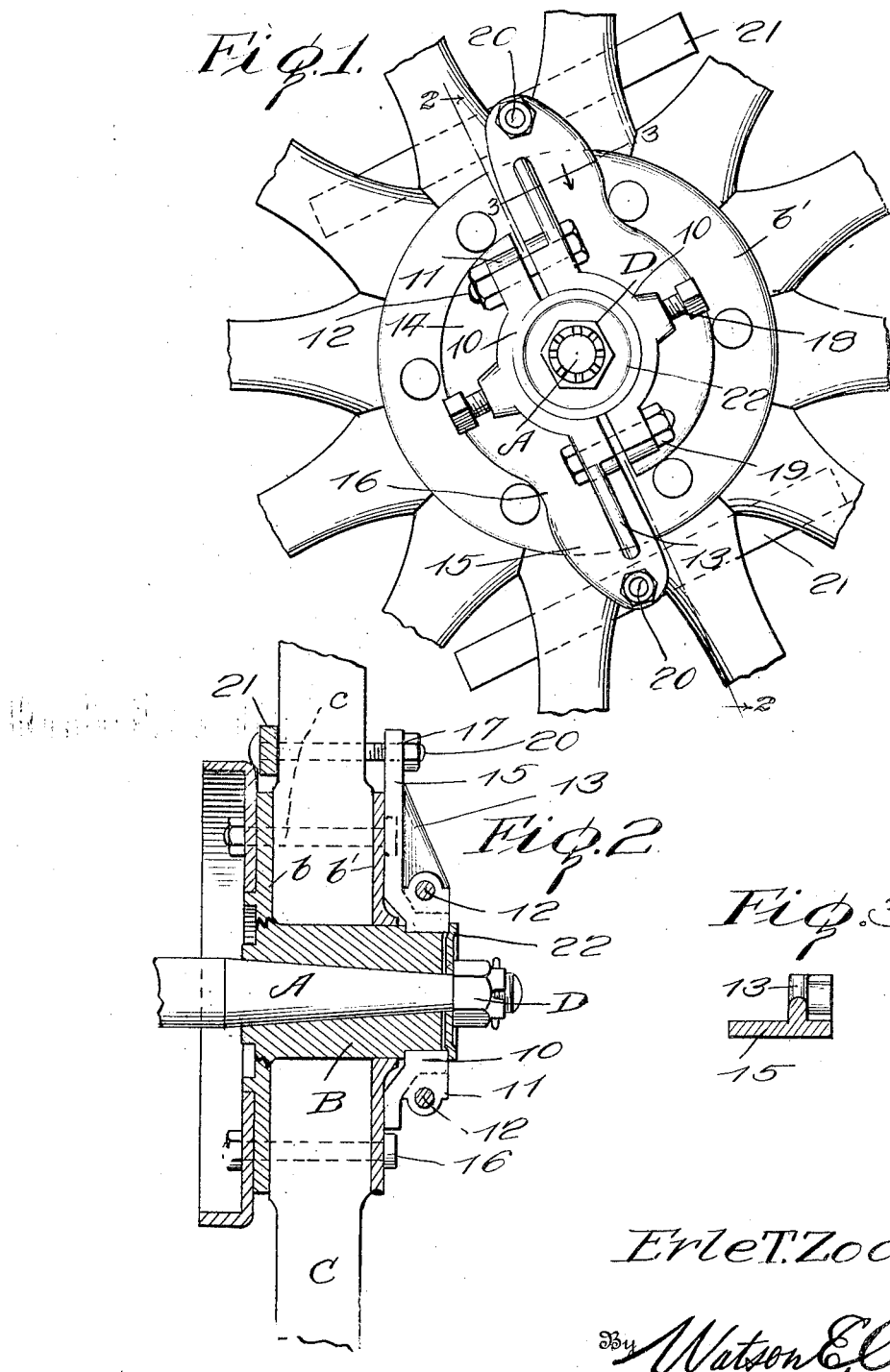
Inventor
Erle T. Zook
By Watson E. Coleman
Attorney Patented Apr. 22, 1924.

1,491,126

UNITED STATES PATENT OFFICE.

ERLE T. ZOOK, OF GLENDO, WYOMING.

AUTOMOBILE REPAIR HUB.

Application filed May 12, 1923. Serial No. 638,583.

*To all whom it may concern:*

Be it known that I, ERLE T. ZOOK, a citizen of the United States, residing at Glendo, in the county of Platte and State of Wyoming, have invented certain new and useful Improvements in Automobile Repair Hubs, of which the following is a specification, reference being had to the accompanying drawings.

This invention relates to emergency hubs, and particularly to a hub attachment which may be applied and which serves to secure the proper rotation of the wheel in the event of the fracture of one of the hub flanges.

The general object of this invention is to provide an attachment of this kind which is very simple, may be easily put in place, and which embodies certain details of construction which permit it to be used either on a front hub or rear hub, which will permit the wheel to be drawn against it to hold the wheel properly in place and prevent it from wabbling or surging from side to side, and which has means to keep the wheel from coming off in case the clamp of the emergency hub should slip.

Other objects will appear in the course of the following description.

My invention is illustrated in the accompanying drawings, wherein:—

Figure 1 is a face view of an automobile repair hub constructed in accordance with my invention;

Figure 2 is a fragmentary sectional view through an automobile wheel showing my repair hub in place taken on line 2—2 of Fig. 1;

Figure 3 is a section on the line 3—3 of Figure 1;

Referring to the drawings, A designates the spindle of an automobile axle, and B the ordinary hub thereof having the spoke C, the hub being provided with the integral inner hub flange *b* and with the outer hub flange *b'*, there being bolts *c* passing through these flanges and through the spokes.

It will be seen from the drawings that my emergency hub clamp is formed in two sections, these sections being similar and confronting each other. Each section is formed to provide a semi-circular hub embracing base 10, this base at one end being laterally extended to form a rib 11 to receive a bolt 12 and at the other end being laterally extended to form a rib 13 to receive a corresponding bolt 12, these bolts passing through the registering perforations and acting to draw the two sections together and upon the hub B.

The base 10 is formed with a semi-circular flange 14 which at one end is radially extended, as at 15, to form a wing adapted to be disposed parallel to the spokes C, the rib 13 bracing and reinforcing this wing. This wing is slightly narrowed at 16 and is rounded at its end and formed with an aperture 17. Preferably a set screw 18 passes through screw-threaded apertures at the middle of each semi-circular portion 10 and, as shown in Figure 1, these screws on the two sections engage the hub.

The two sections of the hub clamping attachment or emergency hub are arranged, as illustrated in Figure 1, so that they will confront each other with the wings 15 extending in opposite directions and approximately radial. The two sections are joined to each other by means of the bolts 12 which pass through aligning perforations in the ribs 11 and 13 and these bolts carry the nuts 19 whereby the two sections may be clamped firmly upon the hub. Bolts 20 pass through the apertures 17 and through the spaces between the spokes of the wheel and engage a plate 21 which is of such length as to extend over several spokes.

It will be seen from Figure 2 that the flanges 14 constitute shoulders extending around the entire circumference of the clamp body. These shoulders also secure a firm bearing against the outer hub flange *b'* to thus prevent the walls from shifting from side to side. The clamp is firmly secured to the wheel by the bolts 20 and if the clamp were not secured to the wheel the wheel would be free to move inward, permitting the hub bolts *c* to ruin the brake shoes and other mechanism.

It is to be particularly noted that my device does not have a closed end, as if it did have a closed end it could not be used on a front hub. Devices of this kind should be provided with means to keep the wheel from coming off in case the clamp should slip, and I have provided such means in the form of a washer 22 which is connected to the reduced end of the spindle A and which is held in place by the nut D, this washer being slightly off-set at its perimeter and extending over the edge of the base 10. The bolt 20 passes between two spokes, and, as before stated, it will be noted that the wings 15 are so constructed that the wing may be disposed between two hub bolts so that when the bolts 20 are tightened by the nuts thereon the wheel is drawn tight against the shoulder or flange 14 and the wing member 15. Thus when power is applied to the wheel the wings move a short distance until each wing comes in contact with a hub bolt and the wheel will then be caused to revolve with the axle.

While this device is intended particularly for certain small cars, it obviously can be made to fit wheels for large cars. It can be cast, forged or otherwise formed of any suitable metal but it will be preferably made from malleable iron.

While I have illustrated certain details of construction and arrangement of parts, I do not wish to be limited thereto, as it is obvious that many changes might be made in these details without departing from the spirit of the invention as defined in the appended claims.

I claim:—

1. An emergency hub clamp for automobile wheels formed in two sections, each section being semi-circular to embrace the hub and to form a shoulder adapted to bear against a hub flange and each section having a radially projecting wing, the wing of one section projecting in an opposite direction from the wing of the other section, means engaging said sections and adapted to clamp them upon the hub, means adapted to hold said sections in engagement with the hub and prevent longitudinal movement thereof, and clamping bolts detachably engaged with the ends of the wings and adapted to extend between the spokes of the wheel, and a spoke engaging member with which the bolt is adapted to engage.

2. An emergency hub clamp for automobile hubs formed in two semi-circular sections, each section having a semi-circular base portion and a radially projecting semi-circular flange, the flange being extended at one end to form a radially projecting wing and the base portion being laterally extended at each end to form ribs perforated for the passage of bolts, each semi-circular portion having a set screw disposed at its middle adapted to engage the hub and each wing at its extremity being perforated for the passage of a bolt, bolts passing through the apertures in the ribs and adapted to hold the two sections clamped upon a hub, and bolts passing through the apertures in the extremities of the wings and adapted to pass between the spokes, each bolt at its end carrying a plate adapted to bridge the space between a plurality of spokes.

3. An emergency hub clamp for automobile hubs formed in two semi-circular sections, each section having a semi-circular base portion and a radially projecting semi-circular flange, the flange being extended at one end to form a radially projecting wing and the base portion being laterally extended at each end to form ribs perforated for the passage of bolts, each semi-circular portion having a set screw disposed at its middle adapted to engage the hub and each wing at its extremity being perforated for the passage of a bolt, bolts passing through the apertures in the extremities of the wings and adapted to pass between spokes, each bolt at its end carrying a plate adapted to bridge the space between a plurality of spokes, each wing adjacent its base being re-entrantly curved on its outer edge for engagement by a hub bolt.

In testimony whereof I hereunto affix my signature.

ERLE T. ZOOK.